(12) United States Patent
Nguyen

(10) Patent No.: US 7,167,473 B1
(45) Date of Patent: Jan. 23, 2007

(54) METHOD FOR DEVICE ADDRESSING USING SNMP COMMUNITY STRING-BASED ROUTING

(75) Inventor: Cuong T. Nguyen, Austin, TX (US)

(73) Assignee: GenBand Inc., Austin, TX (US)

( * ) Notice: Subject to any disclaimer, the term of this patent is extended or adjusted under 35 U.S.C. 154(b) by 1112 days.

(21) Appl. No.: 10/112,347

(22) Filed: Mar. 29, 2002

(51) Int. Cl.
*H04L 12/56* (2006.01)

(52) U.S. Cl. ..................................... 370/392; 370/474

(58) Field of Classification Search ............. 370/392, 370/393, 474, 475
See application file for complete search history.

(56) References Cited

U.S. PATENT DOCUMENTS 6,856,591 B1 * 2/2005 Ma et al. ..................... 370/216
2003/0172170 A1 * 9/2003 Johnson et al. ............. 709/230

* cited by examiner

*Primary Examiner*—Melvin Marcelo
(74) *Attorney, Agent, or Firm*—Baker Botts L.L.P.

(57) ABSTRACT

A method of addressing a data packet includes receiving the data packet and creating a packet header for the data packet. The method also includes providing routing information in a community string format in the packet header and communicating the packet header and data packet to a gateway, wherein the gateway is operable to forward the data packet to a destination uniquely defined by the routing information.

19 Claims, 13 Drawing Sheets

| PARAMETER | DESCRIPTION | TYPE | DEFAULT |
|---|---|---|---|
| GATEWAY ID | IDENTIFIER OF GATEWAY 120 TO WHICH A CPE 140 IS ASSOCIATED | INTEGER (1..200) | NONE |
| IP ADDRESS | GATEWAY 120 IP ADDRESS THE "SHELF" IP ADDRESS | INTEGER | NONE |
| PORT NUMBER | PORT ON WHICH GATEWAY 120 IS LISTENING FOR CPE 140 ROUTING PACKETS | INTEGER | NONE |

*FIG. 5*

| PARAMETER | DESCRIPTION | TYPE | DEFAULT |
|---|---|---|---|
| GATEWAY ID | IDENTIFIER OF THE GATEWAY 120 TO WHICH CPE 140 IS ASSOCIATED | INTEGER (1..200) | NONE |
| SLOT ID | IDENTIFIES THE SLOT OF ANM COMPONENT 220 THAT HAS THE ATM VCL 130 TO CPE 140 | INTEGER (1..18) | NONE |
| PORT ID | IDENTIFIES THE PORT WITHIN ABOVE SLOT OF ANM COMPONENT 220 THAT HAS THE ATM VCL 130 TO CPE 140 | INTEGER (1..4) | NONE |
| VPI | THE VPI NUMBER FOR VCL 130 GOING TO CPE 140 | INTEGER (0..4095) | NONE |
| VCI | THE VPI NUMBER FOR VCL 130 GOING TO CPE 140 | INTEGER (32..65535) | NONE |
| REQUEST ID | REQUEST ID IS RETURN BY CPE 140 IN SNMP RESPONSE 332. REQUEST ID IS ALSO INCLUDED IN AN ERROR RESPONSE FROM GATEWAY 120 PACKET ROUTER | INTEGER | NONE |
| PENDING TIMER | TIMER IS CREATED WHEN A SNMP REQUEST 330 IS SENT TO CPE 140. IF THE TIMER EXPIRES BEFORE A SNMP RESPONSE 332 IS RETURNED FROM CPE 140, MANAGED CPE OBJECT 406 WILL DROP SNMP REQUEST 330 AND CLEAR THE PENDING MESSAGE | TIMER POINTER | NULL |

*FIG. 6*

| FIELD | DESCRIPTION | SIZE IN BYTES | TYPE | BYTES |
|---|---|---|---|---|
| SIZE | TOTAL SIZE OF THE PACKET IN BYTES. THIS INCLUDES THE NUMBER OF BYTES REQUIRED BY THIS FIELD | 2 | INTEGER | 0..1 |
| GATEWAY ID | THE IDENTIFIER OF GATEWAY 120. IN CASE THIS MESSAGE IS SENT FROM SPR 210 TO GATEWAY 120, THEN THIS FIELD IS REDUNDANT, BECAUSE GATEWAY 120 ALREADY KNOWS ITS ID. WHEN THE MESSAGE COMES FROM GATEWAY 120 TO SPR 210, HOWEVER, THIS FIELD IS REQUIRED TO IDENTIFY GATEWAY 120 TO SPR 210 | 1 | INTEGER (1..200) | 2 |
| SLOT ID | THE ANM 220 SLOT ID CONTAINING THE ATM VCL 130 | 1 | INTEGER (1..18) | 3 |
| PORT ID | THE ANM 220 PORT ID CONTAINING THE ATM VCL 130 | 1 | INTEGER (1..4) | 4 |
| VPI | THE VPI NUMBER FOR ATM VCL 130 GOING TO CPE 140 | 2 | INTEGER (0..4095) | 5..6 |
| VCI | THE VCI NUMBER FOR ATM VCL 130 GOING TO CPE 140 | 2 | INTEGER (32..65535) | 7..8 |
| REQUEST ID | REQUEST ID IS USED TO MATCH A REQUEST PACKET TO AN ERROR RESPONSE. THIS FIELD IS NOT USED, AND SHOULD BE SET TO 0, IN THE REGULAR (NON-ERROR) ROUTING PACKET SENT BY GATEWAY PACKET ROUTER TO SPR 210 | 4 | INTEGER | 9..12 |
| SNMP PAYLOAD | SNMP PAYLOAD TO BE FORWARDED TO CPE 140. THE PAYLOAD MAY EITHER BE SNMP REQUEST 330 SENT TO GATEWAY 120 OR SNMP RESPONSE 332 SENT BACK FROM CPE 140 | UP TO 1487 BYTES | TIMER POINTER | 13..1500 |

*FIG. 7*

| FIELD | DESCRIPTION | SIZE (BYTES) | BYTES |
|---|---|---|---|
| SIZE | NUMBER OF BYTES IN THIS MESSAGE. THIS FIELD IS DEFINED TO MAKE THE REQUEST/RESPONSE PACKET STRUCTURE SIMILAR | 2 | 0..1 |
| GATEWAY ID | THE IDENTIFIER OF GATEWAY 120. IN CASE THIS MESSAGE IS SENT FROM SPR 210 TO GATEWAY 120, THEN THIS FIELD IS REDUNDANT, BECAUSE GATEWAY 120 ALREADY KNOWS ITS ID. WHEN THE MESSAGE COMES FROM GATEWAY 120 TO SPR 210, HOWEVER, THIS FIELD IS REQUIRED TO IDENTIFY GATEWAY 120 TO SPR 210 | 1 | 2 |
| SLOT ID | THE SLOT OF ANM COMPONENT 220 CONTAINING THE ATM VCL 130 | 1 | 3 |
| PORT ID | THE PORT ID OF THE ANM COMPONENT 220 CONTAINING THE ATM VCL 130 | 1 | 4 |
| VPI | THE VPI NUMBER FOR THE ATM VCL 130 GOING TO CPE 140 | 2 | 5..6 |
| VCI | THE VCI NUMBER FOR THE ATM VCL 130 GOING TO CPE 140 | 2 | 7..8 |
| REQUEST ID | THE REQUEST ID COPIED FROM THE ORIGINAL REQUEST MESSAGE THAT CAUSED THIS ERROR RESPONSE TO BE SENT. IF A REQUEST ID IS SET TO 0, THIS MESSAGE IS NOT AN ERROR MESSAGE FROM GATEWAY PACKET ROUTER, BUT INSTEAD IS A ROUTED SNMP RESPONSE 332 FROM CPE 140 | 4 | 9..12 |
| ERROR CODE | THIS CAN BE ONE OF THE FOLLOWING VALUES: INVALIDCPE=1 CANTROUTE=2 | 1 | 13 |

FIG. 8

| FIELD | DESCRIPTION | SIZE IN BYTES | BYTES |
|---|---|---|---|
| MESSAGE ID | IDENTIFIES THE MESSAGE TYPE. IN THIS CASE, IT IS ADD GATEWAY (MSG ID=1) MESSAGE | 1 | 0 |
| REQUEST ID | THIS IS THE REQUEST ID THAT WILL BE DUPLICATED IN THE RESPONSE MESSAGE TO HELP GATEWAY MANAGEMENT DEVICE 115 ASSOCIATE A RESPONSE WITH A REQUEST MESSAGE | 4 | 1..4 |
| NUMBER OF GATEWAYS IN THIS REQUEST | THIS IS THE NUMBER OF GATEWAYS TO BE ADDED IN THIS REQUEST. THIS IDENTIFIES HOW MANY OF THE GROUP OF THE FOLLOWING THREE FIELDS ARE SENT IN THIS MESSAGE | 1 | 5 |
| GATEWAY ID | GATEWAY IDENTIFIER | 1 | VARY BY POSITION |
| GATEWAY IP | THE IP ADDRESS OF THE GATEWAY | 4 | VARY BY POSITION |
| GATEWAY PORT | THE PORT NUMBER ON THE GATEWAY ON WHICH GATEWAY PACKET ROUTER IS LISTENING FOR PROPRIETARY PACKETS TO BE ROUTED TO CPE 140 | 4 | VARY BY POSITION |

FIG. 9

| FIELD | DESCRIPTION | SIZE IN BYTES | BYTES |
|---|---|---|---|
| MESSAGE ID | IDENTIFIES THE MESSAGE TYPE. IN THIS CASE, IT IS THE DEL GATEWAY (MSG ID=2) MESSAGE | 1 | 0 |
| REQUEST ID | THIS IS THE REQUEST ID THAT WILL BE DUPLICATED IN THE RESPONSE MESSAGE TO HELP GATEWAY MANAGEMENT DEVICE 115 ASSOCIATE A RESPONSE WITH A REQUEST MESSAGE | 4 | 1..4 |
| GATEWAY ID | THE GATEWAY IDENTIFIER | 1 | 5 |

FIG. 10

| FIELD | DESCRIPTION | SIZE IN BYTES | BYTES |
|---|---|---|---|
| MESSAGE ID | IDENTIFIES THE MESSAGE TYPE. THIS MESSAGE IS SENT FROM SPR 210 TO GATEWAY MANAGEMENT DEVICE 115 TO REQUEST THAT GATEWAY MANAGEMENT DEVICE UPDATE SPR 210 WITH THE GATEWAY 120 LIST. GATEWAY MANAGEMENT DEVICE WILL SEND AN ADD GATEWAY MESSAGE. THIS MESSAGE IS REQ GATEWAY LIST=3 | 1 | 0 |
| SERVICE ID | THIS IS THE SPR 210 SERVICE ID. THIS IS RESERVED FOR FUTURE USE. IT CAN BE USED TO ALLOW GATEWAY MANAGEMENT DEVICE 115 TO SPECIFICALLY ASSIGN DIFFERENT GATEWAYS TO DIFFERENT INSTANTIATIONS OF SPR 210. CURRENTLY, GATEWAY MANAGEMENT DEVICE DOES NOT MAKE USE OF THIS PARTICULAR FIELD; HOWEVER, IN THE FUTURE GATEWAY MANAGEMENT DEVICE MAY BE ABLE TO DETERMINE THE LOAD ON A GIVEN SPR 210 AND LAUNCH ADDITIONAL SPR 210 INSTANCES TO SUPPORT ADDITIONAL GATEWAYS 120. GATEWAY MANAGEMENT DEVICE 115 WILL USE THE "ADD" AND "REMOVE" GATEWAYS 120 MESSAGES TO MOVE GATEWAYS 120 BETWEEN INSTANCES OF SPRs 210 | 4 | 1..4 |

*FIG. 11*

METHOD FOR DEVICE ADDRESSING USING SNMP COMMUNITY STRING-BASED ROUTING

TECHNICAL FIELD OF THE INVENTION

This invention relates in general to the field of communications networks and more particularly to a method for device addressing using Simple Network Management Protocol (SNMP) community string-based routing.

BACKGROUND OF THE INVENTION

The ATM Forum has introduced a Loop Emulation Service-Embedded Operation Channel (LES-EOC) specification for managing Customer Premises Equipment (CPE) using an inband management channel. The LES-EOC specification describes the interaction between a voice gateway and a CPE device operating in a Simple Network Management Protocol (SNMP) environment. The LES-EOC specification is CPE-centric, in that it defines the interaction solely from the point of view of the CPE.

The LES-EOC specification is designed as an inband management channel to manage the CPE by tunneling management requests through the voice gateway via the LES-EOC. Each CPE device connected to a gateway device uses the same SNMP Management Information Base (MIB) and may contain the same set of SNMP Object Identifiers. A simple master/sub-agent implementation requires that each sub-agent implements a completely unique set of OIDs. But in this implementation, the same OIDs may actually exist for multiple CPEs. Thus, the OIDs cannot be used to route to different CPEs. The use of OIDs based routing as utilized by the master/sub-agent implementation cannot be used to solve this CPE reach-ability problem. In traditional communications networks, SNMP devices are assigned an Internet Protocol (IP) address, but it would be impractical to assign an IP address for the hundreds of thousands or even millions of CPE devices that may be present in a network of gateway devices. Therefore, it is desirable to provide a method for uniquely addressing a particular CPE that fulfills all of the requirements of the LES-EOC specification.

SUMMARY OF THE INVENTION

From the foregoing, it may be appreciated by those skilled in the art that a need has arisen for a way to address customer premises equipment other than with an Internet protocol address. In accordance with the present invention, a method for device addressing using Simple Network Management Protocol (SNMP) community string-based routing is provided that substantially eliminates or greatly reduces disadvantages and problems associated with conventional device addressing techniques.

A method of addressing a data packet includes receiving the data packet and creating a packet header for the data packet. The method also includes providing routing information in a community string format in the packet header and communicating the packet header and data packet to a gateway, wherein the gateway is operable to forward the data packet to a destination defined by the routing information.

The present invention provides various technical advantages over conventional data packet addressing techniques. For example, one technical advantage is to provide a method for uniquely identifying a specific destination device using a standard SNMP request packet sent to a gateway device. Another technical advantage is to individually address a large number of SNMP-enabled devices through a single Internet Protocol address and SNMP port. Other technical advantages may be readily ascertainable by those skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIG. 5 illustrates a table of parameters and descriptions of the parameters;

FIG. 6 illustrates a table of parameters for managed CPE data;

FIG. 7 illustrates a table of fields for CPE routing packets;

FIG. 8 illustrates a table of fields for error responses from a gateway packet router;

FIG. 9 illustrates a table of fields for an ADDGATEWAY message;

FIG. 10 illustrates a table of fields for a DELGATEWAY message;

FIG. 11 illustrates a table of fields for a REQGATEWAY message;

DETAILED DESCRIPTION OF THE INVENTION

Figure 1:
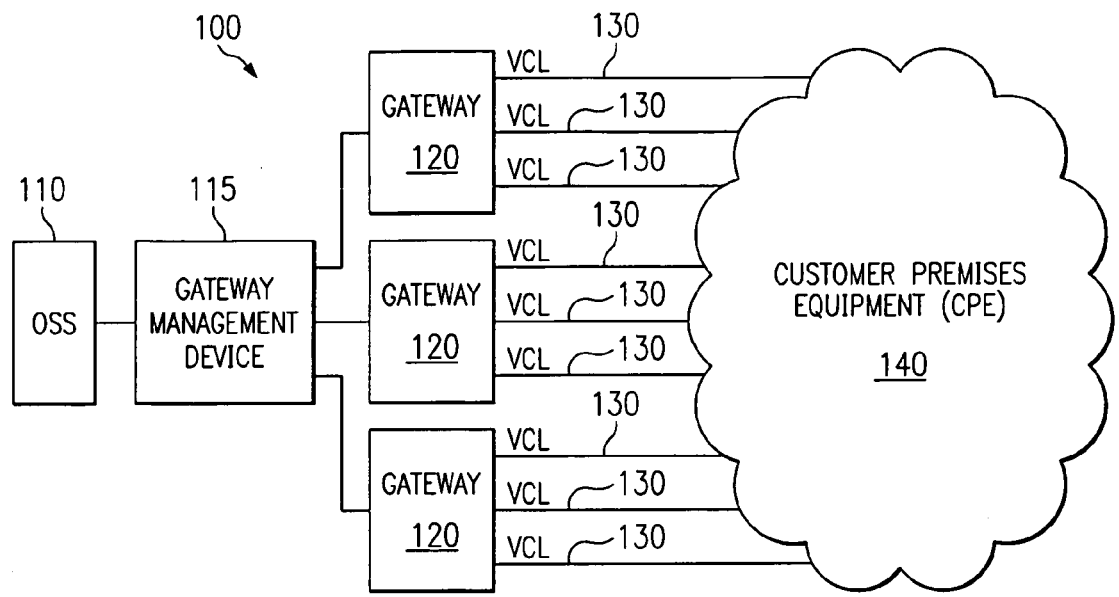
FIG. 1 illustrates a Simple Network Management Protocol (SNMP) network environment.

Referring to FIG. 1, there is illustrated a communications network environment 100 in one embodiment of the present invention. Network environment 100 includes an Operational Support System (OSS) 110, a gateway management device 115, at least one gateway communications device 120, and a plurality of Virtual Circuit Links (VCLs) 130 that are operable to transport data packets between gateway 120 and Customer Premises Equipment (CPE) 140.

In one embodiment of the present invention, network environment 100 comprises an Asynchronous Transfer Mode (ATM) network. For purposes of illustration, network environment 100 will be described in terms of a communications network operating under the Simple Network Management Protocol (SNMP), but it is envisioned that other network protocols may also be within the scope of the present invention. OSS 110 may be located at a Network Operations Center (NOC) or other point of control for network environment 100 and is operable to exchange data information through a plurality of gateway communications devices 120. OSS 110 includes a set of applications that are operable to monitor, analyze, and manage data and devices within communications network 100. Among the network functions of OSS 110 may be tracking network components such as Internet Protocol (IP) addresses, billing, reporting, and tracking customer usage.

Gateway management system 115 may be co-located with OSS 110 within the NOC. The operation of gateway management system 115 will be described below in greater detail.

In network environment 100, one OSS 110 is operable to communicate with a plurality of gateway devices 120. Gateway device 120 is operable to provide a path by which OSS 110 may communicate with CPE 140 along one of a plurality of VCLs 130. VCLs 130 may provide an Asynchronous Transfer Mode (ATM) format communication path. In one embodiment of the present invention, VCL 130 is operable to transport data packets from gateway device 120 to CPE 140 in the SNMP format, but it is envisioned that other protocols such as File Transfer Protocol (FTP) may also be within the scope of the present invention.

CPE 140 may comprise a plurality of communications equipment devices located at the premises of a plurality of customers and will be described below in greater detail. CPE is a non-specific term that may refer to any communications equipment device located at the premises of a customer. CPE 140 may also include an Integrated Access Device (IAD) located at the premises of a customer.

Figure 2:
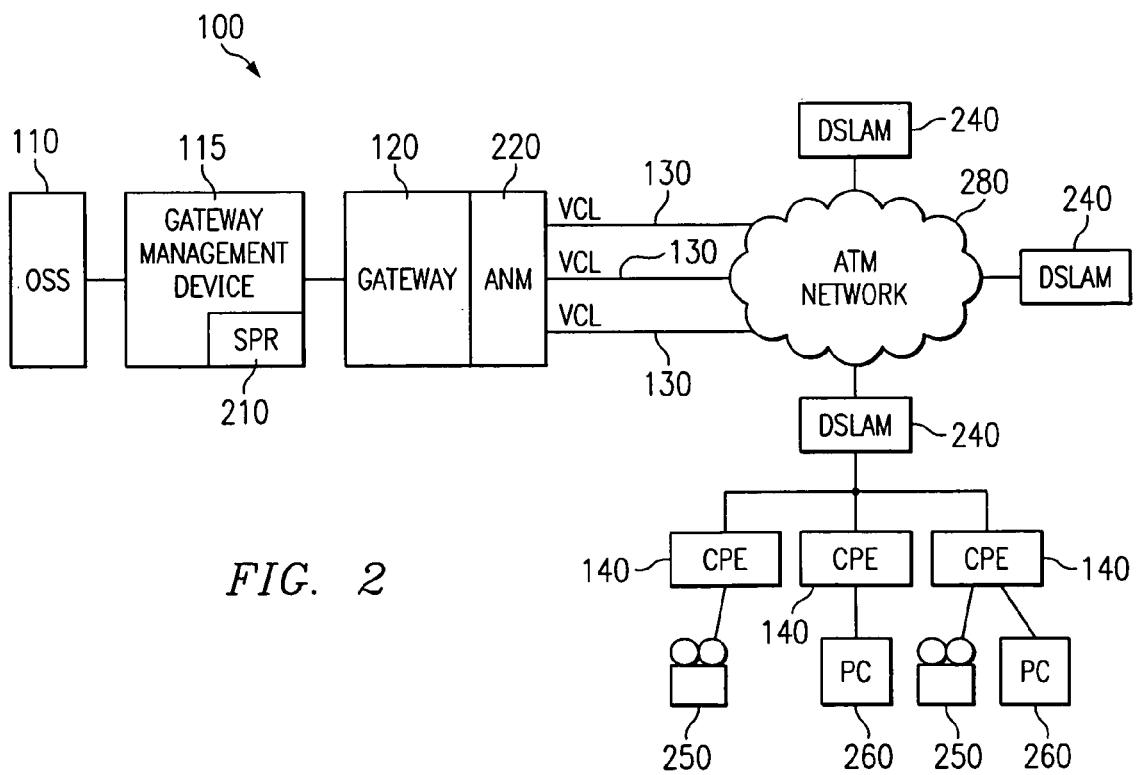
FIG. 2 illustrates the SNMP network in greater detail.

Referring now to FIG. 2, there is illustrated network environment 100 in greater detail. OSS 110 is operable to communicate with a plurality of gateways 120 through gateway management device 115. One component of gateway management device 115 is SNMP Packet Router (SPR) 210, which receives the data packet from OSS 110 and routes it to a specific gateway 120. Gateway 120 is operable to receive the SNMP-format communication from SPR 210. An Access Network Module (ANM) 220 of gateway 120 is operable to receive the data packet from OSS 110 and is further operable to output the data packet across at least one VCL 130. VCLs 130 are connected to an ATM network 230. Within ATM network 230 is at least one Digital Subscriber Line Access Multiplexer (DSLAM) 240. Typically, a plurality of DSLAMs are bunkered together in a locations near CPE 140. Each DSLAM 240 is operable to exchange data packets with a specific CPE 140. Customer communications devices such as a telephone 250 or personal computer 260 or other devices may be connected to network environment 100 by CPE 140.

In one embodiment of the present invention, OSS 110 is operable to communicate over a Loop Emulation Service-Embedded Operation Channel (LES-EOC) as described in the LES-EOC specification established by the ATM Forum. The LES-EOC specification is designed to manage CPEs 140 via an inband management channel within VCL 130 and describes the interaction between a voice gateway 120 and CPE 140. The LES-EOC specification uses the SNMP/ATM Adaptation Layer 2 protocol and defines a SNMP Management Information Base (MIB) to manage CPE 140. The LES-EOC specification, however, is CPE-centered, in that it defines the interaction solely from the point of view of CPE 140.

The LES-EOC specification describes an inband management channel that allows a management device such as OSS 110 to manage CPEs 140 by tunneling management requests through gateway 120 via the LES-EOC channel. The specification, however, does not define a method to uniquely address a particular CPE 140 connected to gateway 120. Traditionally, SNMP devices are assigned an IP address, but management of CPEs 140 over the inband channel does not utilize an IP address. It would be impractical to assign an IP address for each individual CPE 140, because network environment 100 could comprise hundreds of gateways 120 with perhaps tens of thousands of CPEs 140 per gateway 120. Accordingly, the LES-EOC specification indicates that the IP address for CPEs 140 should always be specified as 0.0.0.0 (the NULL address).

Gateway management device 210 is operable to perform a plurality of functions in network environment 100. One function of management device 115 is to route SNMP management request packets between OSS 110 and CPE 140. This task is performed by the SNMP Packet Router (SPR) 210 component of the gateway management device 115. SPR 210 presents a single external interface to OSS 110 for all CPEs 140 within the domain of gateway 120. SPR 210 acts as a proxy agent for all CPEs 140 in the domain and uses community string-based routing to route requests to a specific CPE 140. This concept treats each CPE 140 as a SNMP entity that is responsible for a subset of the LES-EOC MIB.

In one embodiment of the present invention, a method is provided for individually addressing a large number of SNMP-enabled devices through the single IP address and SNMP port of SPR 210. By using the concept of an entity relationship, it is possible to provide a method for routing a SNMP request from OSS 110 to a specific CPE 140 while fulfilling the requirements of the LES-EOC specification. The communications protocol between OSS 110 and CPE 140 is SNMP Version One, which follows the LES-EOC specification. The protocol between SPR 210 and gateway 120 may be proprietary. A SNMP request packet from OSS 110 to SPR 210 includes routing information in the community string for a specific CPE 140. The routing information will be described below in greater detail. The CPE 140 routing information is used by SPR 210 to create a new SNMP request packet, which may be encapsulated in a proprietary message sent to gateway device 120. The proprietary message is constructed so that the CPE 140 routing information may be provided to gateway device 120 in the proprietary packet header, permitting gateway 120 to forward the SNMP data packet from OSS 110 to CPE 140 without decoding the entire SNMP packet. SPR 210 also reformats a SNMP request packet in a format acceptable to CPE 140 prior to sending the request packet through gateway device 120. SPR 210 may communicate one request packet at a time to a specific CPE 140, because the SNMP agent of each CPE 140 may only be able to process one SNMP request at a time. SPR 210 will time out, dropping a request if too much time elapses before SPR 210 receives a response packet from CPE 140.

When OSS 110 issues a request packet for a specific CPE 140, the packet contains sufficient routing information to inform SPR 210 where to direct the request packet. The routing information is given a defined format and is located in the request packet header. A SNMP request sent to SPR 210 from OSS 110 contains routing information for CPE 140 in the community string. In one embodiment of the claimed invention, the format of this community string may be in the form:

LESEOC@<gatewayid>.<slot#>.<port#>.<VirtualPath Identifier (VPI)>.<VirtualChannelIdentifier (VCI)>. The "LESEOC" component of the community string is the default community string expected by the SNMP agent of CPE 140, and this component is used by SPR 210 to configure the community string part of the SNMP request packet to be sent to CPE 140. "LES-EOC" informs SPR 210 that the SNMP request packet is to be communicated via the inband management channel of VCL 130. Though described using LESEOC as an example, other protocols may be equally used as in the use of a "FTP" tag to identify that an FTP protocol packet is being used instead of a LES-EOC SNMP packet The numerical component of the community string includes the routing information that allows SPR 210 to route the SNMP request packet to a particular CPE 140. The <gatewayid> component identifies the specific gateway device 120, i.e. a particular port on a designated ANM 220, that hosts a specific CPE 140 with which OSS 110 seeks to communicate. The <slot#>.<port#> component identifies the physical slot and port on gateway device 120 where the specific VCL 130 is connected that links gateway device 120 to the desired CPE 140. The <VPI>.<VCI> component identifies a specific CPE 140 in communication with gateway device 120 across VCL 130. Thus, by using the routing information provided in the community string, SPR 210 may properly address any CPE 140 connected to any gateway device 120 within the gateway management device 115 domain.

Figure 3:
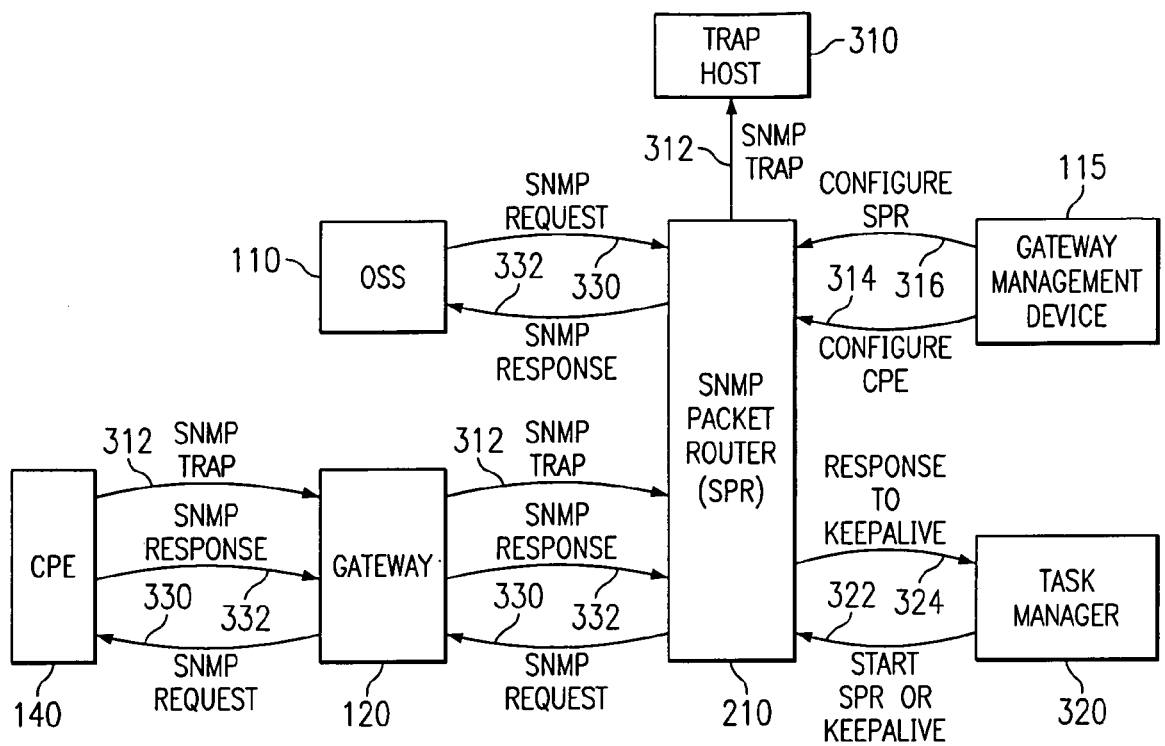
FIG. 3 illustrates interactions between components in the SNMP network.

Referring now to FIG. 3, there are illustrated interactions between components of network environment 100 in one embodiment of the present invention. SPR 210 is operable to route communications among a trap host 310, gateway management device 115, a task manager 320, a plurality of CPEs 140, a plurality of gateways 120, and OSS 110.

Gateway management device 115 is operable to send request packets to SPR 210 to configure aspects of network environment 100. A request packet 314 will configure CPE 140 while a request packet 316 will configure SPR 210.

Task manager 320 is an application residing in gateway management device 115. Task manager 320 is operable to send a request packet 322 to SPR 210 to either start or "keep alive" SPR 210. The response to such a keep alive request from SPR 210 to task manager 320 is illustrated at line 324.

Should CPE 140 need to inform OSS 110 that a condition such as a fault or reboot has occurred, CPE 140 will issue an asynchronous response known as an SNMP "trap" 312. A SNMP trap 312 sent from CPE 140 to gateway 120 and from gateway 120 to SPR 210 will be automatically forwarded to a pre-configured SNMP trap host 310 after first being decoded by SPR 210 and reconstructed with the appropriate community string. The community string will be in the form LESEOC@<gatewayid>.<slot#>.<port#>.<VPI>.<VCI>.
This community string provides OSS 110 with the information necessary to determine the specific CPE 140 from which the trap 312 originated when OSS 110 examines the contents of trap host 310. The IP address in trap 312 will be changed to the IP address of SPR 210 to identify which SPR 210 forwarded trap 312 to trap host 310.

OSS 110 is operable to initiate a SNMP request 330 and communicate request packet 330 to SPR 210. SPR 210 is operable to forward request packet 330 to the appropriate gateway 120. Gateway 120 is then operable to forward request packet 330 to CPE 140. CPE 140 may respond to SNMP request 330 with SNMP response packet 332 that is communicated through gateway 120 and SPR 210 to OSS 110.

Figure 4:
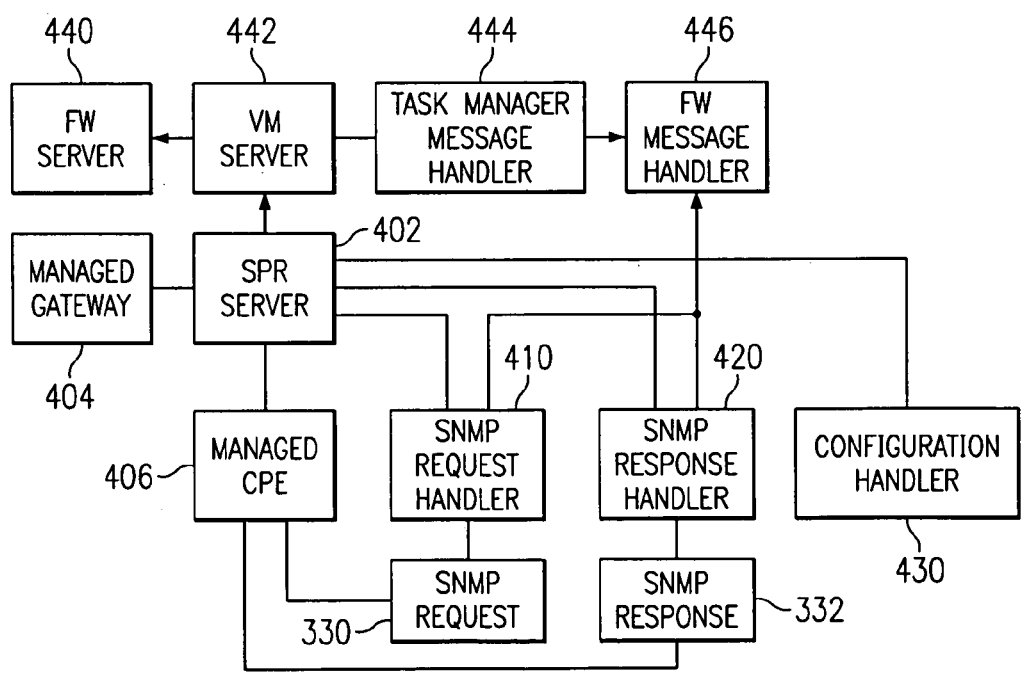
FIG. 4 illustrates an object model of interactions between components in the SNMP network.

Referring now to FIG. 4, there is illustrated an object model showing communications among components of the present invention. SPR 210 includes SPR server 402, which utilizes a SNMP request handler 410 to communicate a SNMP request 330 to one of a plurality of CPEs 140 through one of a plurality of gateway devices 120. SPR server 402 utilizes a SNMP response handler 420 to receive a SNMP response 332 from one of a plurality of CPEs 140 through one of a plurality of gateway devices 120. A configuration handler 430 processes configuration requests from gateway management device 115. A managed gateway object 404 holds routing information for communication with gateways 120. A managed CPE object 406 holds routing information for communication with CPE 140.

A FW server 440 is the base class for all application framework servers. FW server 440 provides the generic structure for all server applications built for OSS 110. A FW message handler 446 is the base class for all input handlers for a framework-based server within OSS 110. FW message handler 446 is operable to accept incoming requests for a specific input source and allow the application-specific code to handle the request. A VM server 442 derives from FW server 440 and is the base class for any OSS 110 services that need to be monitored by task manager 320. VM server 442 provides a communication path to task manager 320 and is operable to receive task manager 320 keep alive messages. Task manager message handler 444 derives from FW message handler 446 and is responsible for processing task manager 320 messages, including receiving task manager 320 keep alive requests.

SPR server 402 is one component of SPR 210. SPR server 402 is the main server class for the SPR 210 application. SPR 210 is operable to open User Datagram Protocol (UDP) sockets, one of which may be passed to each of SNMP request handler 410, SNMP response handler 420, and configuration handler 430. SPR 210 also maintains a list of managed gateways 120. The managed gateways 120 are added and removed from SPR 210 by gateway management device 115 via configuration messages passed in through configuration handler 430. SPR server 402 provides access to the lists of managed gateways 120 and CPEs 140 stored in SPR 210. SPR server 402 provides functions for iterating over these collections, modifying the memberships of the collections, and retrieving individual members of the collections.

Managed gateway object 404 holds routing information for communicating with gateway 120. The routing information may include the IP address for gateway 120 and the port number on which gateway 120 is listening for CPE 140 routing packets. The list of managed gateways 120 is provided to SPR 210 by gateway management device 115 when gateway management device 115 is initiated. After gateway management device 115 is initiated, as gateways 120 are added and removed, SPR 210 will be appropriately updated. The managed gateway object 404 provides the application programming interface for sending request packets 330 to gateway 120. FIG. 5 illustrates a chart providing the description, type, and default parameter of managed gateway data within the managed gateway object 404.

The managed CPE object 406 holds information for routing to CPE 140, and a format of this information is illustrated in FIG. 6. The Managed CPE object 406 preferably holds one pending SNMP request 330. The SNMP request 330 is passed to the managed CPE object 406 when it is received from a requesting object. Managed CPE object 406 is created as SNMP request 330 comes in for CPE 140. Managed CPE object 406 may be retained only long enough to process the request. After the request has been handled, managed CPE object 406 may be removed to free up data storage space. Managed CPE object 406 is responsible for properly constructing the proprietary routing packet that will be sent to CPE 140 via gateway 120. A format for this routing packet is depicted in FIG. 7. When a response from CPE 140 is returned, it is passed to managed CPE object 406. Managed CPE object 406 will reformat the response and send SNMP response 332 back to the original requester.

SNMP request 330 is an encapsulation of a SNMP request. This object class holds the original raw SNMP packet and will be responsible for decoding the SNMP request. SNMP response 332 is an encapsulation of a SNMP response. This response message is actually the SNMP payload extracted from the message defined in FIG. 7. This object class is responsible for decoding the SNMP response packet. The SNMP packet sent from CPE 140 may either be a response packet or a trap. This object class is used to decode and distinguish between these types of SNMP packets.

When a proprietary routing message is sent to gateway 120, the message must be decoded to determine the proper CPE 140 to which the SNMP payload is to be sent. If gateway 120 detects an incoming message on the LES-EOC of a VCL 130, it will create the same message to be returned to SPR 210. In this situation gateway 120 will fill in the routing information for CPE 140 on which ATM VCL 130 is detected in the message.

The first six fields listed in FIG. 7 are always present in a data packet. The SNMP payload is variable in length of up to 1487 bytes in size, which is based on a transmission unit of 1500 bytes less the 13 bytes required for the proprietary header information in the other fields. Whatever is present in the SNMP payload should be sent to CPE 140 without any changes. If gateway 120 cannot locate CPE 140, or if it could not route the SNMP packet to CPE 140 because of an internal problem such as a port or card being down, then it should return an error message.

FIG. 8 defines an error response packet that gateway 120 may return in the case that SNMP request packet 330 cannot be sent to CPE 140. The error packet may either indicate that the CPE 140 address is invalid or it could indicate that the packet could not be routed to CPE 140 due to some internal condition. As just one example, gateway 120 may not be able to route a packet to CPE 140 if ANM 220 card or port is inoperative. The error response packet should also include the request ID that was in the original request that led to the creation of the error packet.

SPR 210 will open a UDP socket on which it will listen to SNMP requests 330 for CPEs 140 under its management domain. The SNMP request handler 410 will manage this UDP socket. As SNMP request 330 enters handler 410, the request packet 330 is decoded to extract the community string. The information in the community string will help handler 410 determine managed CPE object 406 for which this message is destined. If managed CPE object 406 has already been created, this means that there is already a request packet pending for CPE 140. In this situation handler 410 will drop request packet 330. If managed CPE object 406 is not already present, however, handler 410 will create a new instance of managed CPE object 406 to handle request packet 330 and pass request packet 330 to the new managed CPE object 406 for processing.

SPR 210 is also operable to open a UDP socket on which it may listen to a proprietary packet from gateway 120 that contains the response packet 332 from a CPE 140 for a previous request. SNMP response handler 420 manages this socket. When handler 420 receives the response packet, in the format as defined in FIG. 7, it will decode the packet header to determine the managed CPE object 406 for which the packet is destined. It will also decode the SNMP payload to determine if the packet is a trap or a response. If the decoded SNMP packet is a trap, and it is from a known gateway 120, the trap will be forwarded directly to the configured trap host 310. A trap from an unknown gateway will be dropped. If the packet is SNMP response packet 332, handler 420 will try to find a valid managed CPE object 406 that may be waiting for SNMP response 332. If a managed CPE object 406 is found, the message is passed to managed CPE object 406. If managed CPE object 406 is not found, the response 332 will be dropped. If SNMP response 332 is passed to managed CPE object 406, the request ID in SNMP response 332 is matched with the request ID saved for the original request to CPE 140. If the request ID does not match the original request packet ID, the packet is dropped because it is not the response packet 332 for which managed CPE object 406 is waiting.

SPR 210 is further operable to open a UDP socket on which it will listen to configuration requests coming from gateway management device 115. When SPR 210 initiates, it will send a message to gateway management device 115 to request the list of gateways 120 that it needs to manage. If SPR 210 does not get a response from gateway management device 115 within a certain amount of time, SPR 210 will re-send the request. This cycle will continue until SPR 210 receives a response from gateway management device 115. FIGS. 9, 10 and 11 define three configuration messages that SPR 210 may receive.

Referring now to FIG. 9, a message is defined that allows gateway management device 115 to request that SPR 210 add one or more new gateways 120. This message may be sent initially with a list of gateways 120 within the gateway management device 115 management domain. In this case the third field will be the number of gateway records being sent, followed by a group of the Gateway ID, Gateway IP, and Gateway Port fields. After the initial request is sent, gateway management device 115 will update SPR 210 with just one gateway 120 at a time. When a new gateway 120 is added, SPR 210 will start accepting SNMP request packets 330 for CPEs 140 that have routing information indicating that they are connected to the newly-added gateway 120.

Referring now to FIG. 10, a message is defined wherein gateway management device 115 requests SPR 210 to delete, or stop managing, an existing gateway 120. When gateway 120 is deleted, SPR 210 will stop accepting SNMP request packets 330 for CPEs 140 attached to this gateway 120. When gateway 120 is removed, SPR 210 will also terminate all outstanding requests pending for the given gateway 120. When this occurs, no responses will be sent to the affected CPEs 140.

Referring now to FIG. 11, a message is defined wherein SPR 210 requests a list of gateways 120 to be managed from gateway management device 115. When SPR 210 initiates, this request will be sent to gateway management device 115 periodically until gateway management device 115 responds. After device 115 has responded, SPR 210 will rely on device 115 to update the list of gateways 120 as required.

Figure 12:
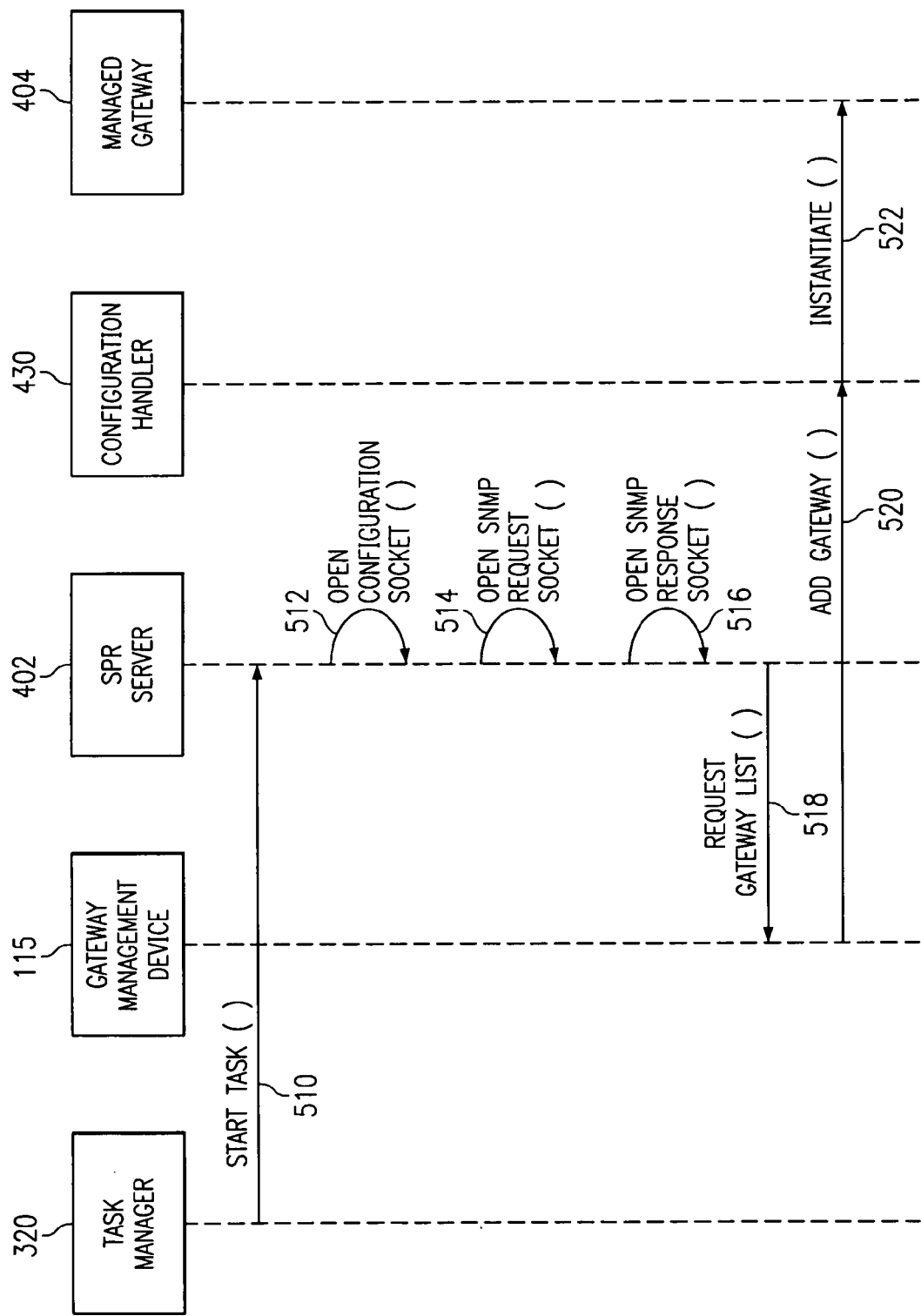
FIG. 12 illustrates a communications sequence for an SPR Startup.

Referring now to FIG. 12, there is illustrated the initiation scenario for SPR 210. While the communications of initiation scenario will be described in detail for an embodiment of the claimed invention, it is envisioned that other communications may also be within the scope of the present invention. Task manager 320 initiates SPR 210 by providing the initial parameters, including default ports for the UDP sockets that SPR 210 uses, the default trap host 310 and port, and the default SNMP time out period for all SNMP messages going to CPE 140. The initiate command is illustrated at Start Task 510. SPR server 402 is further operable to create a new configuration socket and pass it to the configuration handler 430. This command is illustrated at Open- Conf Socket 512. A new SNMP request socket is created and passed to the SNMP request handler 410, as illustrated by Open SNMP Resp Socket 514. A new SNMP response socket is also created and passed to the SNMP response handler 420, as illustrated by Open SNMP Resp Socket 516. SPR server 402 is further operable to send a message to gateway management device 115 to request the list of gateways 120 to be managed, illustrated by command Request Gateway List 518. SPR server 402 will periodically send this message to gateway management device 115 until it gets back a reply message from gateway management device 115 to add gateways 120 as illustrated by command Add Gateway 520. Once SPR server 402 receives this reply 520 from gateway management device 115, SPR server 402 may rely on gateway management device 115 to update the list of managed gateways as needed. Gateway management device 115 is further operable to send a message to configuration handler 430 to update the SPR managed gateways list. Configuration handler 430 will create one or more instances of managed gateway object 404 as requested, illustrated by the command Instantiate 522.

Gateway management device 115 may at any time send SPR server 402 a message to add gateway 120. After gateway 120 is added, SPR server 402 will start processing requests going to gateway 120 or arriving from gateway 120. Unless gateway 120 is known by SPR server 402, all requests to and from gateway 120 will be dropped. When SPR 210 is shut down, all processing is terminated. In one embodiment of the present invention, no data is saved, and any pending messages are discarded. Data or pending messages may be saved at SPR 210 shut down as desired, and such alternatives are envisioned to be within the scope of the present invention.

Figure 13:
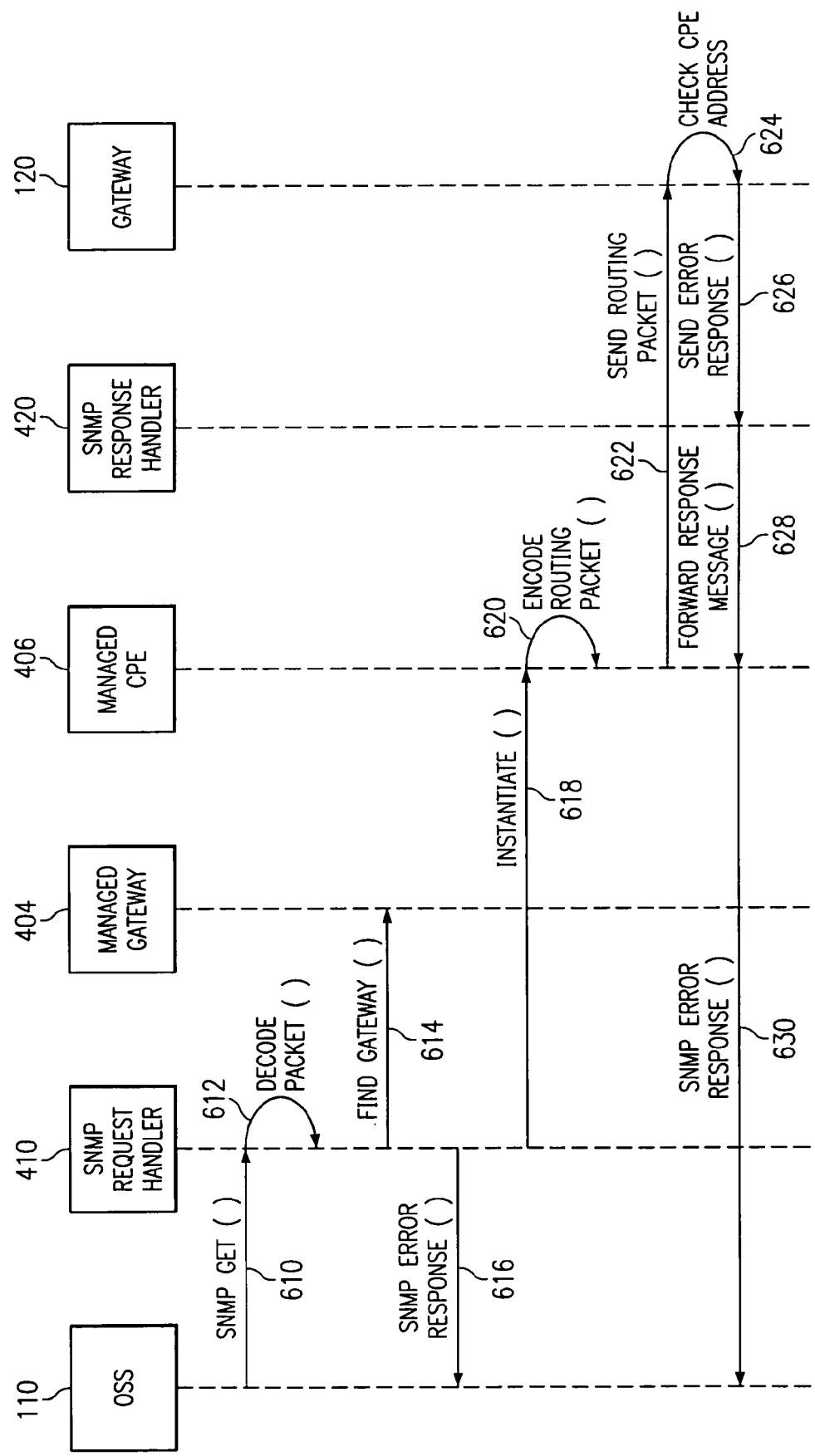
FIG. 13 illustrates a communications sequence for a request to an invalid CPE.

Referring now to FIG. 13, there is illustrated the scenario of OSS 110 issuing a SNMP request packet 330 for an invalid CPE 140. While communications during an invalid CPE scenario will be further described in detail, other communications are envisioned that may also be within the scope of the present application. FIG. 13 may depict both the result when gateway 120 for CPE 140 is not being managed by SPR 210 and when CPE 140 does not exist among gateways 120. In a first step, an SNMP request 330 is sent from OSS 110 to SPR 210 and is received by SNMP request handler 410. This is illustrated by a command SNMP Get 610. The request packet 330 is then decoded and the routing information is retrieved from the community string as illustrated at command 612. The list of gateways 120 in managed gateway object 404 is accessed to find the gateway 120 specified in the routing information as illustrated by a Find Gateway command 614. If gateway 120 is not found during this step, a "no-such-name" SNMP error response 616 is sent back to OSS 110.

If gateway 120 is located, the list of managed CPEs 140 in managed CPE object 406 is checked to determine if CPE 140 is already waiting for a request. If CPE 140 is not waiting for a previous request, a new managed CPE object 406 is created to handle the present request, as illustrated with Instantiate command 618. SNMP request 330 and a reference to managed gateway object 404 are passed to managed CPE object 406. Managed gateway object 404 creates a new routing message that includes routing information for CPE 140, formatting the message as shown in FIG. 7. SNMP request packet 330 is also reformatted so that the community string of request packet 330 contains only the <CPE Community String> portion of the routing string. A new SNMP request ID retrieved from SPR server 402 and is used to replace the original request ID in the incoming SNMP request packet 330. The original request ID is also placed in the routing packet header in case a gateway 120 returns an error message without being able to forward the request packet to CPE 140. The original request ID is saved so that it can be matched with the return message. The encoding is illustrated at command 620.

The routing message is sent to a gateway 120 by command 622, which validates that the routing information sent in the packet is correct by command Check CPE Address 624. If the routing information refers to a non-existing CPE 140, an error response is sent back to SPR 210 in a command 626, the format of which is defined in FIG. 8. The request ID found in the original routing packet is used in the error response packet to allow SPR 210 to link this response with the original request. The response message is received by SNMP response handler 420. The message is decoded and the header information is used to locate the appropriate managed CPE object 406 waiting for the response. The message is passed to managed CPE object 406 with command 628, which verifies that the request ID in error response 626 matches the request ID previously saved for this request. If the request ID does not match, the error response 626 may be ignored. If the request ID does match, managed CPE object 406 creates an error response message 630 to be sent back to OSS 110. Error response 630 will contain the original request ID found in the incoming SNMP request packet 330. Error response 630 will be sent with the "no-such-name" error code. Error message 630 is sent back to OSS 110 that originally sent the request 330. The original UDP packet contains the IP address and port number where OSS 110 expects to see the response.

Figure 14:
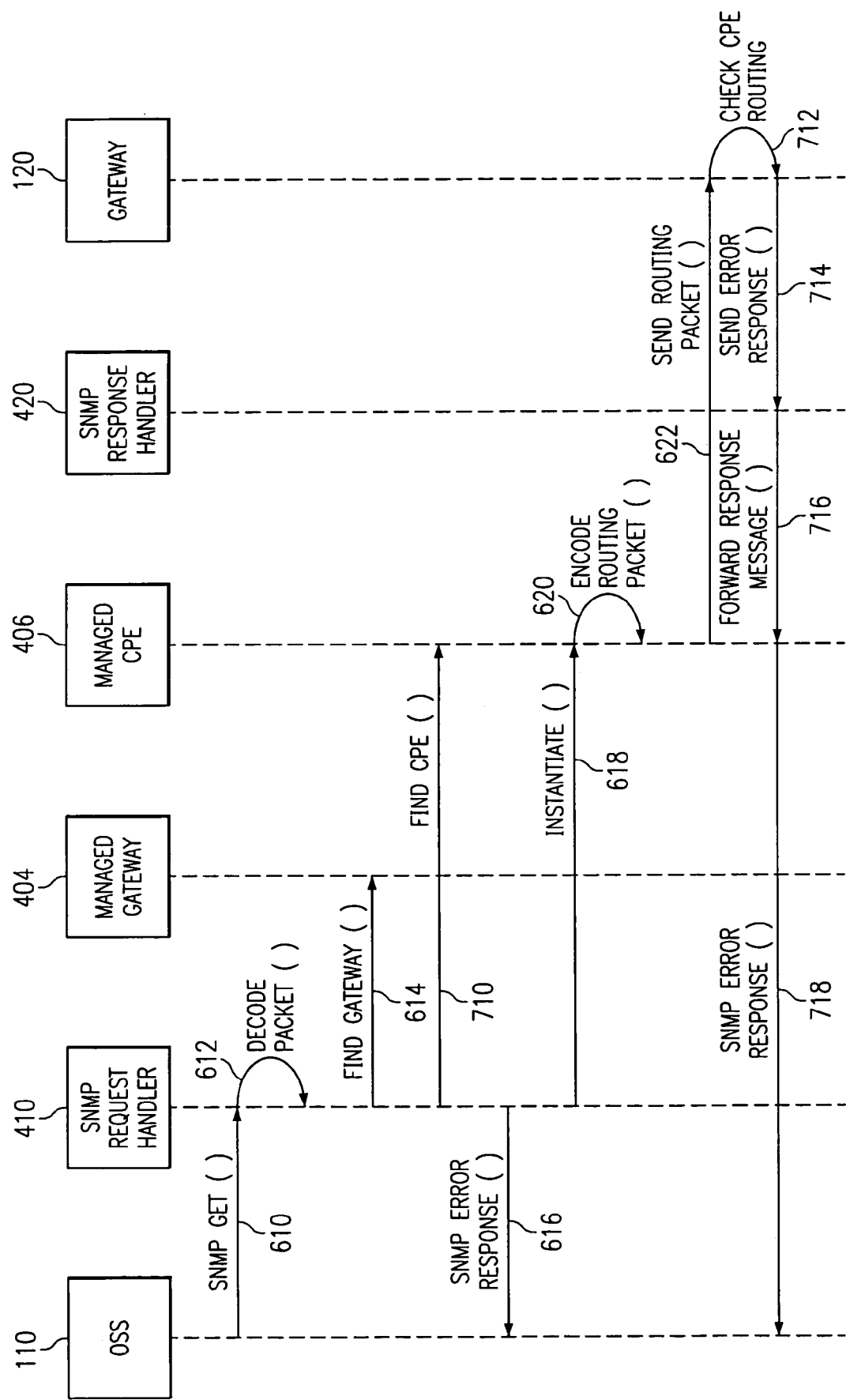
FIG. 14 illustrates a communications sequence to a busy CPE.

Referring now to FIG. 14, there is illustrated a request to a busy CPE 140 according to one embodiment of the present invention. While the communications of the request method will be described in some detail, it is envisioned that other communications for requesting to busy CPE 140 may also be within the scope of the claimed invention.

FIG. 14 illustrates the condition wherein an SNMP request packet 330 is sent from OSS 110 to SPR 210, wherein SNMP request handler 410 receives request packet 330 as illustrated at command 610. Request packet 330 is decoded and the routing information is extracted from the SNMP community string at command 612. The list of managed gateways 120 in managed gateway object 404 is checked to see if CPE 140 is already waiting for a request packet 330 as illustrated by command Find CPE 710. A new managed CPE object 406 is created to handle the request packet 330 as illustrated by command Find CPE 710. The original SNMP request packet 330 along with a reference to managed gateway object 404 is passed to managed CPE object 406 by command 618.

Managed CPE object 406 is operable to create a new SNMP request packet wherein the SNMP community string contains only the <CPE Community String>. A new request ID is retrieved from SPR server 402 to be used as the request ID in the SNMP request packet replacing the original request ID sent from OSS 110. The original request ID is also placed in the routing packet, along with the routing information to be sent to gateway 120 in the format defined in FIG. 7. The packet encoding is illustrated at command 620.

The routing packet is sent to gateway 120 at command 622 and the gateway 120 must check to see that the CPE routing information is correct and the path to CPE 140 is available, as is illustrated by the command Check CPE route 712. If gateway 120 cannot route the packet for any reason, gateway 120 will create an error response packet 714 to be sent back to SPR 210 with an error code of "CANTROUTE"

in the message format of FIG. 8. The original request ID from the routing packet sent by SPR 210 is copied into error response packet 714.

Error response packet 714 is sent back to SPR 210 and is received by SNMP response handler 420. The message is decoded and the header information is used to locate the appropriate managed CPE object 406 that may be waiting for the response. The message is passed to managed CPE object 406 as illustrated by command 716. Managed CPE object 406 verifies that the request ID of error response 714 matches the request ID previously saved for this request. If the request ID does not match, then error message 714 is ignored. If there is a match, the SNMP error response 714 is sent back to OSS 110 as illustrated at command 718.

Figure 15:
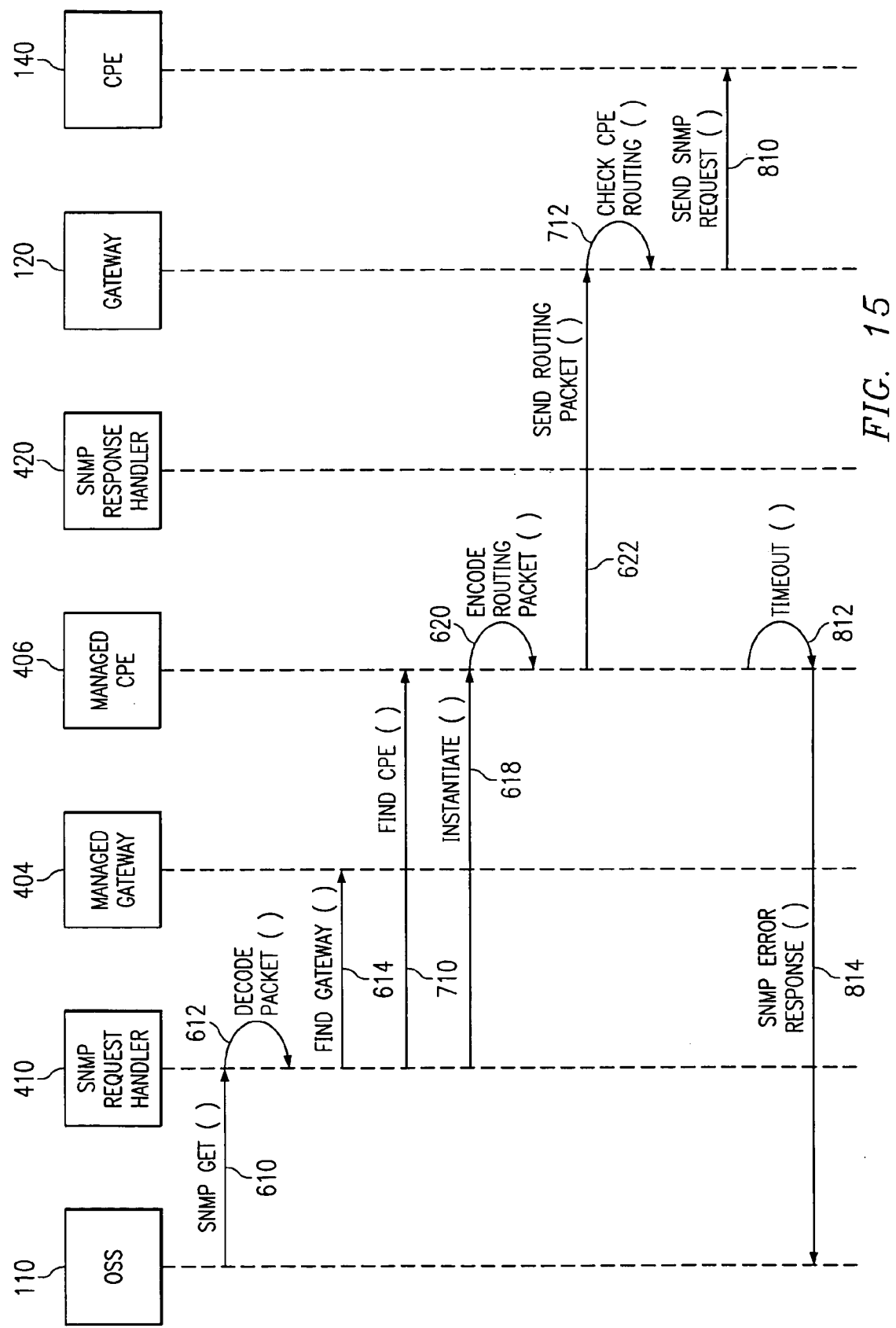
FIG. 15 illustrates a communications sequence wherein a CPE does not respond.

Referring now to FIG. 15, there is illustrated the condition of a non-responsive CPE 140 in a network environment 100 in one embodiment of the claimed invention. While the communications below will be described in some detail, other responses to a non-responsive CPE 140 are envisioned that may also be within the scope of the present invention.

An SNMP request packet 330 is sent from OSS 110 to SPR 210, where the request packet 330 is received by SNMP request handler 410 as illustrated in command 610. Request packet 330 is decoded and the routing information is extracted from the SNMP community string at command 612. The managed gateway list in managed gateway object 404 is accessed to locate the proper gateway 120 from the routing information and to determine if there is a CPE 140 already waiting for a packet as illustrated by commands 614 and 710.

Where CPE 140 is not already waiting on a request, a new managed CPE object 406 is created by command 618 to handle the request and is passed the original SNMP request packet 330 along with a reference to the managed gateway object 404. A new SNMP request packet is created, wherein the SNMP community string contains only the <CPE Community String>. A new request ID is retrieved from SPR server 402 to be used as the request ID in the SNMP request packet, replacing the original request ID sent from OSS 110. The original request ID is also placed in the routing packet along with the routing information to be sent to gateway 120 in the message format defined in FIG. 7. The packet encoding is illustrated at command 620.

Prior to sending the packet to gateway 120, managed CPE object 406 will create a timer for the request. The timer period may be defined at the time SPR 210 is initiated. The routing packet is sent to the proper gateway 120 at command 622 and the gateway 120 checks to see that the CPE routing information is correct and that the path to CPE 140 is available as illustrated by command 712. If the packet can be sent to CPE 140, the SNMP payload is extracted from the message and sent to CPE 140 over the LES-EOC channel by command 810.

If after the established time period there is no response from CPE 140, the timer in managed CPE object 406 will expire as illustrated at command 812. When it expires, the original request is dropped. In the scenario where no response is returned to OSS 110, its own timer may handle the condition. If an SNMP error response 814 is constructed, it may be returned to OSS 110. The error code in this response 814 would be "resource unavailable."

Figure 16:
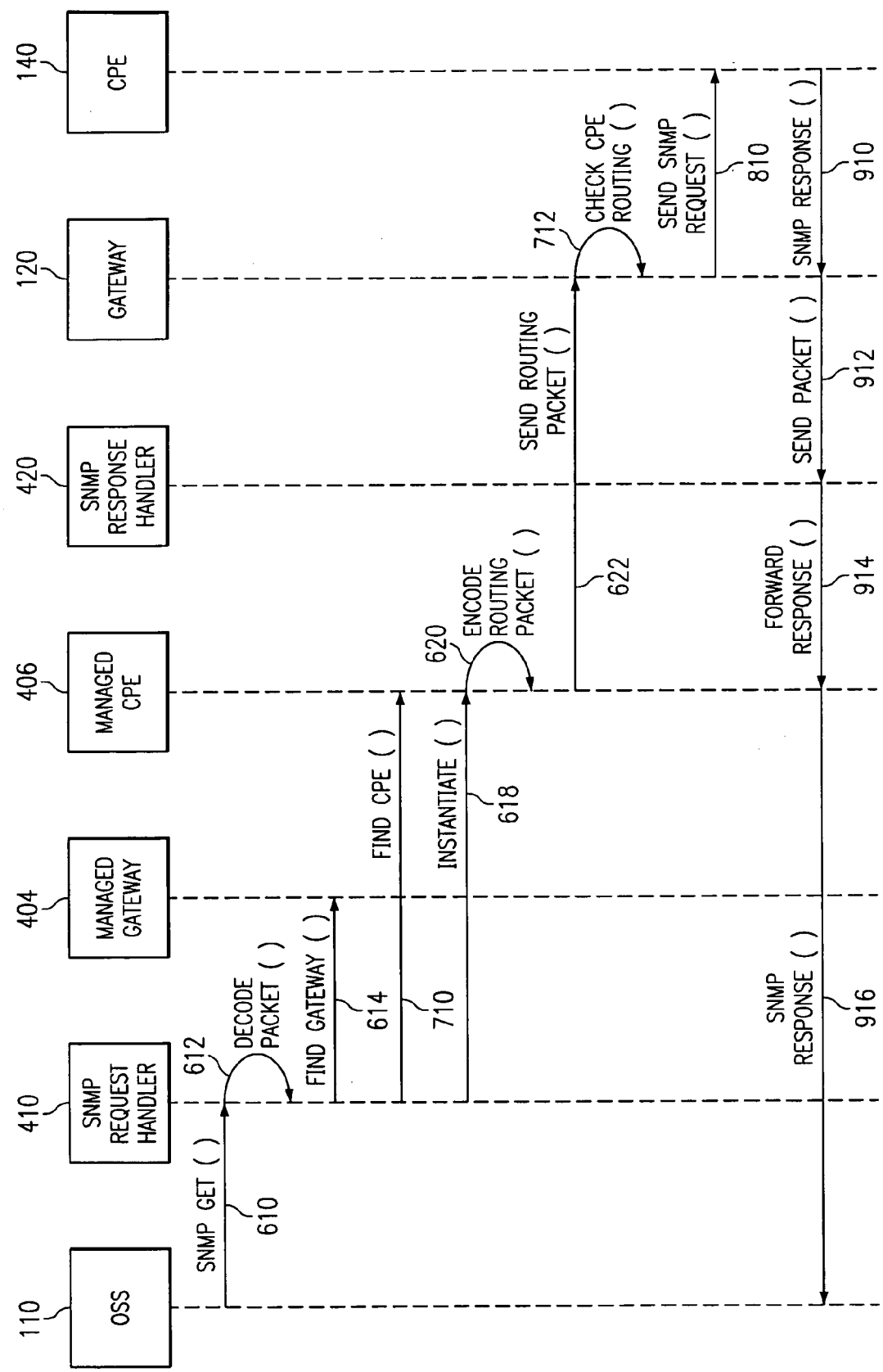
FIG. 16 illustrates a communications sequence including a response from a CPE.

Referring now to FIG. 16, there is illustrated the scenario of a SNMP request packet 330 for a valid CPE 140 and the CPE 140 response to that request. While the communications in FIG. 16 will be described in some detail, other communications including a request for a valid CPE 140 and the CPE 140 response are envisioned that may also be within the scope of the present invention.

An SNMP request packet 330 is communicated from OSS 110 to SPR 210, where SNMP request handler 410 is operable to receive the request as illustrated by command 610. The request packet 330 is decoded and the routing information is extracted from the SNMP community string as illustrated by command 612. The list of managed gateways 120 maintained by managed gateway object 404 is accessed to locate the proper gateway 120 from the routing information as shown by command 614. The managed gateways list is further examined to determine if there is a CPE 140 already waiting for a packet at command 710. If CPE 140 is not already waiting on a request, a new managed CPE object 406 is created to handle the request packet 330 at command 618. The original SNMP request packet 330 and a reference to managed gateway object 404 are passed to managed CPE object 406. A new SNMP request packet is created wherein the SNMP community string contains only the <CPE Community String>. A new request ID is retrieved from SPR server 402 to be used as the request ID in the SNMP request packet, replacing the original request ID from OSS 110. The original request ID is also placed in the routing packet, along with the routing information to be sent to gateway 120 in the format defined in FIG. 7. The packet encoding is illustrated at command 620. Before sending the request packet to gateway 120, managed CPE object 406 creates a timer for the request. The timer period may be defined when SPR 210 is started.

The routing packet is sent to the proper gateway 120 at command 622. Gateway 120 checks to see that the CPE routing information is correct and that the path to CPE 140 is available as illustrated at command 712. If the packet can be sent to CPE 140, the SNMP payload will be extracted from the message and sent to CPE 140 over the LES-EOC channel as illustrated at command 810. A response is sent back from CPE 140 for the original request at command 910. When gateway 120 sees a message on the LES-EOC channel it constructs a routing packet, in the format defined in FIG. 7, to be sent back to SPR 210. The routing packet contains the routing information identifying gateway 120 and CPE 140 sending the message. Request ID in the routing packet is not used and may be set to zero (0).

The routing packet is sent back to SPR 210 and received by SNMP response handler 420 at command 912. The packet header is retrieved to determine the proper managed CPE object 406 to process the header. The SNMP payload is also decoded to see if the package is a trap or a response message. If the packet is a response message, it will be forwarded to the managed CPE object 406 to be processed at command 914. The method of processing a trap is illustrated in FIG. 17 and will be discussed in greater detail below.

Upon receiving the response packet from SNMP response handler 420, managed CPE object 406 will determine if the request ID in the SNMP packet matches the request ID originally saved. If there is no match, the response will be dropped, which may mean that a time out condition has previously occurred for this request. If there is a match, a SNMP response packet 332 is constructed with the proper community string, which matches the original community string sent in the request, and request ID, which matches the request ID sent in the original request, to be sent to OSS 110. This communication is illustrated by SNMP response 916.

Figure 17:
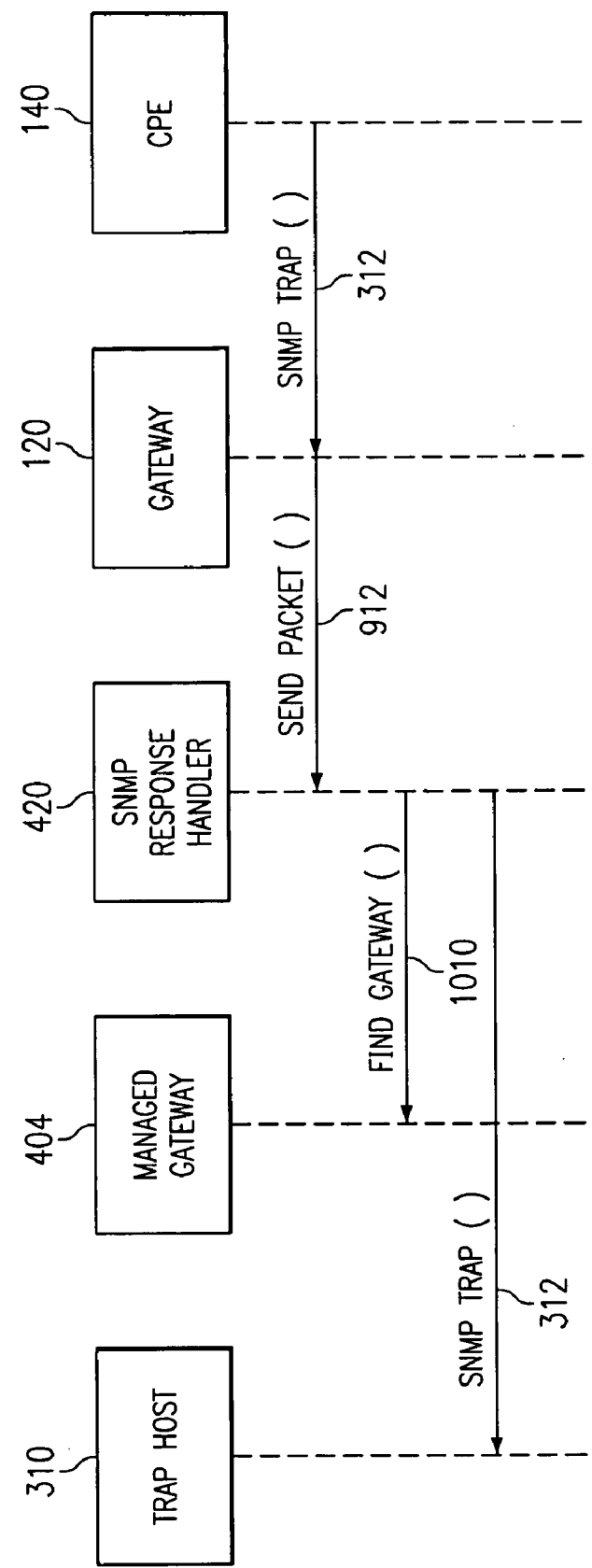
FIG. 17 illustrates a communications sequence including a trap received from a CPE.

Referring now to FIG. 17, there is illustrated the condition wherein an SNMP trap 312 is received from CPE 140. While the communications of FIG. 17 will be described in some detail, it is envisioned that other communications may also be within the scope of the present invention.

SNMP trap 312 is received on the LES-EOC channel from CPE 140. The gateway 120 receives the trap and puts the trap in a routing packet to be sent to SPR 210 at command 912. The routing information in this packet will identify the gateway 120 and CPE 140 sending the trap. The request ID in the routing packet header is not used and it may be set to zero (0).

SNMP response handler 420 is operable to receive the packet and the packet header is decoded to get the routing information. The SNMP payload is decoded to determine whether it comprises a response or a trap. For a packet determined to be a trap, SNMP response handler 420 checks to see if gateway 120 identified in the trap is a valid gateway 120 as illustrated by find Gateway command 1010. If gateway 120 is not found, the packet is dropped. If gateway 120 is found, an SNMP trap message is constructed with a community string in the form <gatewayid>.<slotid>.<portid>.<VPI>.<VCI>. The trap 312 is then forwarded to the configured trap host 310 from SNMP response handler 420 by command 312.

Thus, it is apparent that there has been provided, in accordance with the present invention, a method for device addressing using SNMP community string-based routing that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of addressing a data packet, comprising:
  receiving the data packet;
  creating a packet header for the data packet;
  providing routing information in an encoded format in the packet header, wherein the routing information uniquely identifies a destination device; and
  communicating the packet header and data packet to a gateway device;
  wherein the data packet is formatted in the Simple Network Management Protocol format.

2. The method of claim 1, wherein the gateway device is operable to communicate the data packet to the destination device identified by the routing information.

3. A method of addressing a data packet, comprising:
  receiving the data packet;
  creating a packet header for the data packet;
  providing routing information in an encoded format in the packet header, wherein the routing information uniquely identifies a destination device; and
  communicating the packet header and data packet to a gateway device;
  wherein the data packet includes a request packet to be communicated to a destination device.

4. The method of claim 3, further comprising:
  storing an address of an originating device of the request packet;
  receiving a response packet from the destination device; and
  communicating the response packet to the originating device.

5. The method of claim 4, further comprising:
  waiting to receive a first response packet from the destination device in response to a first request packet communicated to the destination device before communicating a second request packet to the destination device.

6. A method of addressing a data packet, comprising:
  receiving the data packet;
  creating a packet header for the data packet;
  providing routing information in an encoded format in the packet header, wherein the routing information uniquely identifies a destination device; and
  communicating the packet header and data packet to a gateway device;
  wherein the gateway device is operable to communicate the data packet to the destination device identified by the routing information;
  wherein the data packet is communicated to the destination device on an inband management channel.

7. The method of claim 6, wherein the inband management channel is an LES-EOC management channel.

8. A method of addressing a data packet, comprising:
  receiving the data packet;
  creating a packet header for the data packet;
  providing routing information in an encoded format in the packet header, wherein the routing information uniquely identifies a destination device; and
  communicating the packet header and data packet to a gateway device;
  wherein the routing information is of the form ProtocolType@<gatewayid>.<slot#>.<port#>.<virtual path identifier>.<virtual circuit identifier>.

9. The method of claim 8, wherein the <gatewayid> component of the routing information includes an identification of the gateway device along a communication path to the destination device.

10. The method of claim 9, wherein the <slot#>.<port#> component of the routing information includes an identification of a physical slot and a physical port of the gateway device along a communication path to the destination device.

11. The method of claim 10, wherein the <virtual path identifier>.<virtual circuit identifier> component of the routing information includes an identification of a specific device as the destination device of the data packet.

12. A method of storing a data packet in a data packet host, comprising:
  receiving the data packet;
  identifying an originating device of the data packet;
  providing location information for the originating device in a community string format in a packet header;
  assigning an internet protocol address to the data packet that is the same as an internet protocol address for a routing device; and
  routing the packet header and data packet to a storage device.

13. The method of claim 12, wherein the data packet is formatted in Simple Network Management format.

14. The method of claim 12, wherein the location information is communicated on an inband management channel.

15. The method of claim 14, wherein the inband management channel is an LES-EOC management channel.

16. The method of claim 12, wherein the routing information is of the form ProtocolType@<gatewayid>.<slot#>.<port#>.<virtual path identifier>.<virtual circuit identifier>.

17. The method of claim 16, wherein the <gatewayid> component of the routing information includes an identification of a gateway device along a communication path from the originating device.

18. The method of claim 16, wherein the <slot#>.<port#> component of the routing information includes an identification of a physical slot and a physical port of the gateway device along a communication path from the originating device.

19. The method of claim 16, wherein the <virtual path identifier>.<virtual circuit identifier> component of the routing information includes an identification of a specific device as the originating device of the data packet.

* * * * *